United States Patent
Templeton et al.

(10) Patent No.: US 6,310,134 B1
(45) Date of Patent: Oct. 30, 2001

(54) ADHESION-PROMOTING PRIMER COMPOSITIONS FOR POLYOLEFIN SUBSTRATES

(75) Inventors: Lisa Kay Templeton, Kingsport; Kevin Alan Williams, Mt. Carmel; Richard Leon McConnell; Michael Alan Callahan, both of Kingsport, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/342,181

(22) Filed: Jun. 29, 1999

Related U.S. Application Data

(60) Provisional application No. 60/091,168, filed on Jun. 30, 1998.

(51) Int. Cl.[7] .................................................. C08F 267/04
(52) U.S. Cl. ........................... 524/531; 524/549; 525/285
(58) Field of Search ...................................... 524/531, 549

(56) References Cited

U.S. PATENT DOCUMENTS

| | | | |
|---|---|---|---|
| 3,480,580 | 11/1969 | Joyner et al. | 260/29.6 |
| 3,579,485 | 5/1971 | Folzenlogen et al. | 260/78.4 D |
| 3,616,047 | * 10/1971 | Kehe | 156/334 |
| 4,070,421 | 1/1978 | Etter, Jr. | 260/897 C |
| 4,299,754 | 11/1981 | Shiomi et al. | 260/33.6 UA |
| 4,789,568 | 12/1988 | Matoba et al. | 427/412.1 |
| 4,954,573 | 9/1990 | Fry et al. | 525/327.6 |
| 5,373,048 | 12/1994 | Witzeman et al. | 524/458 |
| 5,534,577 | 7/1996 | Namba et al. | 524/377 |
| 5,585,192 | 12/1996 | Sharma et al. | 428/500 |
| 5,728,767 | 3/1998 | Kanetou et al. | 524/504 |

FOREIGN PATENT DOCUMENTS

| | | |
|---|---|---|
| 835910 | 3/1970 | (CA) . |
| 0 148 346 | 7/1985 | (EP) . |
| 0 725 111 A2 | 8/1996 | (EP) . |
| 2 265 626 A | 10/1993 | (GB) . |
| 2 273 294 A | 6/1994 | (GB) . |
| 49 010 890 A | 1/1974 | (JP) . |
| 53-1291 | 1/1978 | (JP) . |
| WO 94/24197 | 10/1994 | (WO) . |

OTHER PUBLICATIONS

Derwent Abstract No. XP002116735, JP 51–042794, "Novel Chlorinated Graft Polyolefin Preparation Stabilized After Denature Characteristic".

* cited by examiner

*Primary Examiner*—Bernard Lipman
(74) *Attorney, Agent, or Firm*—Rose M. Allen; Harry J. Gwinnell

(57) ABSTRACT

The invention relates to solvent-based primer compositions containing 0.5 to 40 weight percent of a modified polyolefin and a solvent selected from the group consisting of ester solvents, ketone solvents, aliphatic solvents, aromatic solvents and mixtures thereof. The modified polyolefin is formed from an amorphous polyolefin selected from polypropylene and a propylene copolymer or a propylene terpolymer or an ethylene copolymer or terpolymer. Preferably the polyolefin is a polypropylene copolymer or terpolymer containing about 1 to about 99 mole percent ethylene, 1-butene, 1-pentene, and 1-hexene. The amorphous polyolefin has a number average molecular weight ranging from about 1,000 to 15,000 and is chemically modified with one or more unsaturated carboxylic acids selected from the group consisting of acids, esters and anhydrides. These primers are useful for significantly improving the adhesion of paints to polyolefin surfaces.

20 Claims, No Drawings

ADHESION-PROMOTING PRIMER COMPOSITIONS FOR POLYOLEFIN SUBSTRATES

This application claims benefit under 35 U.S.C. §119 of U.S. Provisional Application Serial No. 60/091,168, filed Jun. 30, 1998. This provisional application is hereby incorporated by reference in its entirety.

FIELD OF THE INVENTION

The invention relates to adhesion-promoting primer compositions for use on polyolefin substrates. More particularly, the invention relates to solvent-based primer compositions containing an amorphous polyolefin being chemically modified with one or more unsaturated carboxylic acids, as well as, their corresponding acid anhydrides thereof and having a number average molecular weight ranging from about 1,000 to 15,000.

BACKGROUND OF THE INVENTION

Molded plastic parts are widely used in automobiles, trucks, household appliances, toys and the like. Frequently these plastic parts are made from polyolefins such as polyethylene, ethylene copolymers, polypropylene, propylene copolymers, and polyolefin blends. One such blend is thermoplastic olefin (TPO), which is rubber-modified polypropylene. Frequently, these plastic parts have to be painted in order to match the color of painted metal parts which are also present in the automobiles, appliances, or toys. Generally, paints do not adhere well to these plastic parts due to their wax-like surface and their chemical inertness.

One approach to improving the adherence of paint to polyolefins is to use an adhesion promoting composition as a separate primer coating between the polyolefin substrate and the paint. The primer coating adheres adequately to both the polyolefin and the paint and thereby creates a unitary three component structure with the paint as the outer portion of the structure. Alternatively, an adhesion promoting primer composition may be added directly to the paint as a "stir in" adhesion promoter.

Certain carboxylate modified polyolefins have been found to be useful as adhesion promoting primers. Generally, these modified polyolefins have been formulated into solvent-based and water-based adhesion promoting primer compositions. The surface of the part is "primed" by application of the adhesion promoting primer composition and the solvent or water is allowed to evaporate. The surface so primed is then readily coated with any of a variety of different coating compositions to provide a strongly adherent and durable coating.

Conventionally, adhesion promoting primer compositions have been formulated with polyolefins which have been modified with unsaturated carboxylic acids or acid anhydrides. In some instances, such as in U.S. Pat. Nos. 3,579,485, 4,070,421 and 4,954,573, carboxylic acid modified polyolefins have themselves been chlorinated to further improve their primer properties. Chlorinated polyolefins, however, can be expensive to produce and their toughness and durability depends upon the amount of chlorination provided, which can vary. Additionally, some chlorinated polyolefins exhibit only limited solubility in anything other than aromatic or chlorinated solvents. Additionally, the presence of chlorine in the chlorinated polyolefin may pose environmental concerns as to the recyclability and disposal of the chlorine coated materials.

Another approach that has been taken for coating polyolefins involves primer compositions containing carboxylate modified polyolefins which are solubilized in an organic solvent. For example, U.S. Pat. No. 4,299,754 and Canadian Patent 835,910 disclose the coating of polyolefins with compositions containing carboxylate modified polyolefins which may be solubilized in a solvent, such as an aromatic or aliphatic hydrocarbon or a chlorinated hydrocarbon. Unfortunately, such compositions have not always proven effective for coating molded plastic parts.

Other primer-based compositions have attempted to avoid the use of solvents in forming modified polyolefin primer compositions. Typically such compositions are water-based primer coating compositions which require the addition of an emulsification agent, such as a nonionic or anionic surfactant. While such primers may be suitable for certain applications, water-based primers generally suffer from water-sensitivity problems. For example, water-based compositions typically exhibit poor adhesion when immersed in 40°C. water or subjected to high temperatures with high humidity.

Thus, there exists a need for a primer composition having a modified polyolefin which exhibits good solubility in non-aromatic solvents and which provides suitable adhesion of paints to polyolefin substrates.

SUMMARY OF THE INVENTION

The invention solves the problems arising from previous primer compositions. The invention provides superior levels of paint adhesion to polyolefin surfaces, and improved durability and resistance to water and gasoline as well as thermal shock. Another benefit is the ease in which conventional additives may be added to the primer compositions of the invention.

The primer compositions of the invention generally are solvent-based. Primer compositions of the invention contain a solvent selected from the group consisting of ester solvents, ketone solvents, aliphatic solvents, aromatic solvents and mixtures thereof, and about 0.5 to 40 weight percent of modified polyolefin. The modified polyolefin comprises an amorphous polyolefin which has been chemically modified with one or more unsaturated carboxylic acid or acid anhydrides thereof. The amorphous polyolefin is formed from a polyolefin, including, but not limited to polypropylene homopolymers, copolymers and terpolymers and ethylene copolymers and terpolymers. Generally, the amorphous propylene copolymers and terpolymers of the invention contain ethylene, 1-butene, 1-pentene, or 1-hexene in amounts ranging from about 1 to about 99 mole percent. Similarly, amorphous ethylene, 1-butene, 1-pentene and 1-hexene copolymers and terpolymers of the invention contain about 1 to about 99 mole percent ethylene, 1-butene, 1-pentene or 1-hexene. The modified polyolefin has a number average molecular weight which may range from about 1,000 to 15,000. As mentioned above, the primer compositions of the invention are capable of significantly improving the adhesion of paints to polyolefin surfaces.

DESCRIPTION OF THE INVENTION

The invention provides solvent-based primer compositions which improve the adhesion of paint to polyolefin surfaces. In particular, the primer compositions of the invention are capable of improved durability and resistance to water, gasoline and thermal shock. Furthermore, the primer compositions of the invention can be formulated to exhibit better adhesion for both urethane and melamine topcoats.

The invention relates to solvent-based primer compositions. One component of the primer composition is a chemically-modified amorphous polyolefin. The amorphous polyolefin is preferably a propylene homopolymer, copolymer or terpolymer and is chemically modified with one or more unsaturated carboxylic acids, preferably selected from the group consisting of acids, esters, and anhydrides. The chemically modified polyolefin generally has a number average molecular weight ranging from 1,000 to 15,000. The modified polyolefin may be dispersed in an ester, ketone aliphatic or aromatic solvent to form a solvent-based primer composition. The solvent-based primer composition may contain other conventional ingredients or components to provide the desired aesthetic or functional effects.

A solvent-based primer composition of this invention is useful as a primer for coating substrates of olefin polymer molded articles and applying adhesives or varnishes to various substrates. Furthermore, the primer composition may be used in ink formulations and may be used in a foil stamping process where the primer composition aids the adhesion of foil to a substrate such as polypropylene. A preferred use of the solvent-based primer composition of the invention is as a primer for coating the surfaces of olefin polymer molded articles. For example, a primer composition of the invention may be used with a variety of plastic surfaces or parts made from polyolefins such as polyethylene, ethylene copolymers, polypropylene, propylene copolymers, and polyolefin blends with other polymers (e.g., thermoplastic olefin (TPO), a rubber-modified polypropylene). The primer compositions may also be used to promote adhesion to metal surfaces.

A solvent-based primer composition of the invention contains a chemically-modified amorphous polyolefin, where the amorphous polyolefin is selected from polypropylene, propylene copolymers and propylene terpolymers. In addition to propylene, the amorphous polyolefin propylene copolymers and terpolymers may contain about 1 to about 99 mole percent ethylene, 1-butene, 1-pentene, 1-hexene or mixtures thereof. Similarly, the primer compositions of the invention may be formed from ethylene, 1-butene, 1-pentene and 1-hexene copolymers and terpolymers. Generally, the copolymers and terpolymers of ethylene, 1-butene, 1-pentene and 1-hexene contain about 1 to about 99 mole percent ethylene, 1-butene, 1-pentene, 1-hexene and mixtures thereof. Through the selection of the appropriate polyolefin to be modified it is possible to control the properties of the resulting modified polyolefin. For example, polyolefins with a substantial level of propylene tend to exhibit better adhesion properties for propylene and thermoplastic olefin substrates whereas polyolefins formed from ethylene-butene tend to have poor adhesion for TPO substrates.

Preferred polyolefins contain $\geq$ about 70 mole percent propylene, preferably, $\geq$ about 75 mole percent propylene, more preferably $\geq$ about 80 mole percent propylene and most preferably about 80 to about 90 mole percent propylene. Examples of particularly preferred amorphous polyolefin copolymers include, but are not limited to, a copolymer having 87 mole percent propylene and 13 mole percent ethylene and a copolymer having 45 mole percent propylene and 55 mole percent hexene. Commercially available polyolefins may be employed, such as those available from Creanova, Somerset, N.J., Huntsman Polymers Corporation, Odessa, Tex. and Eastman Chemical Company, Kingsport, Tenn. For example, Rextac RT 2585 and RT 2780 are available from Huntsman Polymers Corporation and Vestoplast 828 and Vestoplast 520 are available from Creanova and propylene copolymers having 10 to 20 weight percent of an alpha olefin comonomer having 2 to 8 carbon atoms, such as ethylene, are available from Eastman Chemical Company.

The amorphous polyolefins used in a primer composition of the invention are chemically modified, or grafted, with one or more unsaturated carboxylic acids as well as their corresponding acid anhydrides or esters. Any unsaturated carboxylic acid which may be grafted onto the amorphous polyolefin may be used as a modifying acid. Suitable modifying acids and anhydrides include, but are not limited to, maleic acid, maleic anhydride, fumaric acid, citraconic anhydride, aconitic anhydride, itaconic anhydride, acrylic acid and methacrylic acid. Two preferred unsaturated modifying acids include a maleic acid and maleic anhydride and the use of which result in maleated polyolefins.

Conventional procedures for grafting these unsaturated carboxylic acids or acid anhydrides thereof to polyolefins may be employed. For example, suitable grafting procedures include, but are not limited to, those described in U.S. Pat. No. 3,480,580 and U.S. Patent 4,567,223, the disclosures of which are incorporated herein by reference in their entirety. A preferred process for the modification of a polyolefin with an unsaturated carboxylic acid, ester, or anhydride thereof is described in U.S. Provisional Application Serial No. 60/138,230 filed on Jun. 9, 1999 entitled "Solution Modification of Polyolefins, the disclosure of which is incorporated by reference in its entirety. As described in U.S. Provisional Application No. 60/138,230 , a preferred process for the modification of a polyolefin with an unsaturated acid involves the following steps: dissolution of the polyolefin in the appropriate solvent at a particular temperature; modification of the polyolefin by addition of an unsaturated anhydride, unsaturated acid, or unsaturated ester and a radical initiator; holding the reaction for a suitable period of time to allow completion of the reaction; if necessary, distillation to remove the solvent used in the modification reaction; and if desired, dissolution of the molten modified polyolefin in a suitable solvent or mixture of solvents. The solvents for the solution modification of the polyolefins should be selected to minimize competition and side reactions between the polyolefin and the solvent for the acid. Thus, it is preferred that the solvents for the solution modification process do not contain benzylic hydrogens or secondary hydrogens. Examples of suitable solvents for the solution modification process include, but are not limited to, t-butylbenzene, anisole, biphenyl, diphenyl ether, and methyl benzoate.

The acid number of the modified amorphous polyolefins may vary depending upon the desired function of the primer composition. For example, modified polyolefins having a low acid number may have poor solubility, whereas a modified polyolefin with a high acid number may be water-sensitive and exhibit poor water and humidity resistance. Generally, the modified polyolefins for the primer compositions of the invention have acid numbers ranging from about 1 to about 100, preferably about 4 to about 60, more preferably about 20 to about 60 and most preferably about 35 to about 55.

Advantageously, the modified, amorphous polyolefins used in this invention have a molecular weight which allows for the modified polyolefin to be solubilized in ester, ketone, and aliphatic hydrocarbon solvents. Thus, as with the acid number, the molecular weight of the number average molecular weight may vary depending upon the desired function of the primer composition, however, it is preferred that the molecular weight be less than 15,000. By forming a primer composition with a modified polyolefin having a molecular weight of less than 15,000 it is possible to achieve better solubility of the modified polyolefin in non-aromatic solvents. Additionally, a molecular weight of less than 15,000 reduces compatibility problems and facilitates the addition of additives, and, when applying the primer composition to a substrate, modified polyolefins of less than 15,000 molecular weight are more readily crosslinked.

Generally, the modified polyolefins used in a solvent-based primer composition of the invention have a number average molecular weight ranging from about 1,000 to 15,000, preferably about 1,000 to about 10,000, more preferably about 2,000 to about 10,000 and most preferably about 4,000 to about 10,000. All molecular weights described maybe measured via a gel permeation chromatography (GPC) method. Additionally, the modified polyolefins of the invention generally exhibit a Ring and Ball Softening Point ranging from about 90° C. to about 165° C. , preferably about 90° C. to about 120° C. as determined by ASTM E28 testing. Also, the glass transition temperature ($T_g$) of the modified polyolefins, as performed on a Differential Scanning Calorimeter (DSC), will typically fall in the range of about −30° C. to −10° C. , preferably about −25° C. to −15° C.

The primer compositions of the invention contain about 0.5 to about 40 weight percent of the modified polyolefin. More preferably, the modified-polyolefin is present in an amount of 0.5 to 30 weight percent. Most preferably, the primer composition contains about 0.5 to about 15 weight percent modified polyolefin. Additionally, mixtures of chemically-modified amorphous polyolefins may be used in a primer composition of the invention. It is also possible to form blends of amorphous modified polyolefins and blends of amorphous modified polyolefins and crystalline propylene polymers. For example, a suitable blend could be formed by maleating a mixture of amorphous polyolefin and polypropylene.

A solvent selected from the group consisting of ester solvents, ketone solvents, aliphatic solvents, aromatic solvents and mixtures thereof, constitutes a second component of a solventbased primer composition of the invention. The solvent is generally present in an amount sufficient to substantially dissolve the modified polyolefins described above. Typically, a sufficient amount of solvent is about 60 to about 99.5 weight percent of the composition. Preferably, the solvent may be present in an amount ranging from about 85 to about 99.5 weight percent, more preferably about 85 to about 95 and most preferably in an amount ranging from about 90 to about 95 weight percent.

Generally, the solvent may be an aliphatic or aromatic hydrocarbon solvent, for example, toluene, xylene, heptane, naphtha, mineral spirits and petroleum distillates such as Lacolene® solvents which are available from Ashland Chemical Company of Ohio. Preferred aromatic solvents include, but are not limited to, xylene, toluene, Lacolene® solvents and naphtha, especially Varnish Makers and Painters naphtha (VM&P). A preferred aliphatic hydrocarbon solvent is a cyclic aliphatic hydrocarbon, such as Cypar 7 and Cypar 9 which are available from Shell Corporation, Houston, Tex. Additionally, the solvents may be ester or ketone solvents. Preferred ester solvents include, for example, ethyl acetate, propyl acetate, isopropyl acetate, butyl acetate, isobutyl acetate, amyl acetate, ethyl propionate, isobutyl isobutyrate and the like. Reasonable evaporation rates for primer coating applications, may be achieved when using solvents including, but not limited to, butyl acetate, isobutyl acetate, butyl propionate, mineral spirits, naphtha, Lacolene®, heptane, octane, xylene, toluene, and Aromatic 100® which is available from Exxon Chemical Company. A solvent which provides a preferred evaporation rate is Aromatic 100®. Additionally, with regards to evaporation, it is preferred that the solvents employed in the primer composition are not on the Hazardous Air Pollutants (HAPs) list recited in the Federal Clean Air Act Amendments of 1990. Also, chlorinated solvents are generally not used because of environmental concerns and government regulations.

Mixtures of aromatic, aliphatic, ester or ketone solvents, or combinations of solvent with one or more co-solvents may also be used. A solvent/co-solvent mixture will generally contain from about 1 to about 99 weight percent of the ester, ketone, aliphatic or aromatic hydrocarbon solvent. Useful co-solvents include ketones such as acetone, methyl ethyl ketone, methyl isobutyl ketone, methyl amyl ketone and the like.

A solvent-based primer composition of the invention may also contain other additives to impart desirable properties to the composition or a coating formed with the primer composition. For example, the water-immersion resistance of the coating may be improved by adding a titanium complex to the primer composition. A titanium complex may generally be present in an amount ranging from 0.01 to 10 weight percent of the primer composition.

A solvent-based primer composition of this invention may contain other additives commonly used in primer compositions or to promote adhesion of coatings to surfaces. Examples of such additives include, but are not limited to, other resins soluble or insoluble in the solvent, plasticizers, antioxidants, ultraviolet absorbers, antistatic agents, organic or inorganic pigments or metal powders, viscosity modifiers, thixotropy modifiers, fillers, and anti-sag agents.

Examples of the other resins which may be added to the solvent-based primer composition include, but are not limited to, polyolefin polymers such as polypropylene, an ethylene-propylene copolymer, poly-1-butene and ethylene-vinyl acetate copolymer, chlorination products of these polyolefins, a saponification product of an ethylene-vinyl acetate copolymer, polyesters, alkyd resins, epoxy resins, melamine resins, polyurethane resins, acrylic resins and styrene resins.

Examples of the plasticizers include, but are not limited to, alkyl esters of phthalic acid such as dibutyl phthalate and dioctyl phthalate, alkyl esters of adipic acid and sebacic acid, butyl benzylphthalate, tris (2-ethylhexyl) trimellitate, tris (2-ethylhexyl) phosphate,2-ethylhexyl diphenyl phosphate, tricresyl phosphate, dimethyl ethylene diphthalate, diethyl ethylene diphthalate, 2-phenylethyl ether and diphenyl ether.

Examples of the antioxidants include, but are not limited to, 2,6-di-t-butyl-p-cresol, o-t-butyl-p-cresol, tetrakis-[methylene-3-(3,5-di-t-butyl-4-hydroxyphenyl)propionate] methane, and p-phenylenediamine.

Examples of the ultraviolet absorbers include, but are not limited to, 2,4-dihydroxybenzophenone, 2-(2'-hydroxy-3',5'-di-t-butylphenyl)-5-chlorobenzotriazole, 2-(2-hydroxy-3-t-butyl-5-methylphenyl)-5-chlorobenzotriazole, and bis(2,2', 6,6')tetramethyl-4-piperidine)sebacate.

Examples of the antistatic agents include, but are not limited to, lauryl diethanolamine, palmityl diethanolamine, stearyl diethanolamine, oleyl diethanolamine, behenyldiethanolamine, polyoxyethylene alkylamines, stearyl monoglyceride, and 2-hydroxy-4-n-octoxybenzophenone.

Examples of organic pigments or metallic powders include, but are not limited to, titanium dioxide ($TiO_2$), zinc white (zinc oxide; ZnO), zinc sulfide (ZnS), carbon black, zinc dust, silicon carbide (SiC), red oxide of iron ($Fe_2O_3$), chrome yellow (lead chromate; $PbCrO_4$), cadmium yellow (CdS), chrome green (mixture of chrome yellow and Prussian blue), chromium oxide green ($Cr_2O_3$), Prussian blue (iron blue; $KFe^{3+}[Fe^{2+}(CN)_6]$), cobalt blue ($CoO_n Al_2O_3$), aluminum powder, silver powder, bronze powder, zinc powder and gold powder.

Examples of the viscosity modifiers, thixotropy modifiers and anti-sag agents include, but are not limited to, metallic soaps, silica gel and bentonite.

The amounts of such additives will depend upon the particular use of the primer compositions and may be the same as those used in other solvent-based primer compositions. For instance, the amount of the other resins may be about 0.01 to about 50 weight percent. The amount of the plasticizers may range from about 0.01 to about 5 weight percent. The amount of the antioxidants, ultraviolet absorbers, or antistatic agents may range from about 0.01 to about 5 weight percent. The amount of the pigments or metallic powders may range from about 0.01 to about 10 weight percent. The amount of the viscosity modifiers, thixotropy modifiers or anti-sag agents may range from about 0.01 to about 10 weight percent.

Any convention process may be used to prepare the solvent-based primer compositions of the invention. For example, a modified amorphous polyolefin may be dissolved in a solvent, generally with stirring or other agitation. Moderate heating may be applied to more rapidly dissolve the polyolefin in the solvent. Additives may be incorporated initially with the polyolefin or may be added after the polyolefin has dissolved in the solvent.

A solvent-based primer composition of this invention can be applied to a substance in any manner known in the art. For example, a primer composition of the invention may be applied by spraying, brushing, dipping or roll coating. The coating is then generally dried by air drying or forced drying such as heating, e.g., convection or infrared heating, or other appropriate methods. Also it is possible to mix a primer composition with a topcoat paint prior to its application to a desired substrate, such as a polyolefin substrate. The lower molecular weight and increased solubility of the modified polyolefins in a primer composition of this invention cause the primer compositions to be effective as additives to paint without significantly increasing its solution viscosity or HAPs solvent content. Thus, a solvent-based primer composition of the invention may be added to other coating compositions as a "stir-in" adhesion promoter.

Paints or other coating compositions can be coated on plastic substrates, such as polyolefin substrates, or surface-treated by the solvent-based primer of this invention through any known methods such as electrostatic deposition, spray coating and brushing. These paints may be applied by recoating. The paints are not limited to any particular paint and will, in general, be chosen on the basis of the ultimate use of the coated substrate. However, when a coated film having a high adhesion to paints is especially required, solvent-type thermoplastic acrylic resin paints, solvent-type thermosetting acrylic resin paints, melamine resins, acrylic-modified alkyd resins, epoxy resin paints and polyurethane paints may be used. The coatings may be dried or cured by suitable heating means such as heating with electric heat, heating with infrared rays and dielectric heating. The heating conditions may be easily selected by one of skill in the art depending on materials or forms of the olefin polymer molded articles, properties of paints, etc.

When using existing water-based primers, the primed polyolefin substrates should be thoroughly dried by infrared or convection heating before applying the topcoat. A solvent-based primer composition of this invention may be simply air-dried before topcoating. A solvent-based primer composition also provides good penetration into the polyolefin surface and provides much better paint adhesion than is possible with water-based primers. A solvent-based composition of the invention can also be used on metal substrates.

The following examples will further illustrate the invention.

EXAMPLES

Example 1

This example illustrates the preparation of a composition of the invention using a particular maleated amorphous polyolefin in aromatic hydrocarbon solvent. 5 grams of a maleated amorphous propylene-ethylene copolymer comprised of about 87 mole percent propylene and about 13 mole percent ethylene having an acid number of 56 were dissolved in 95 grams of xylene at 130° F. to give a 5 percent, by weight, solids primer solution. The $M_n$ of the modified polymer was 7500 g/mol.

This composition was spray applied as a primer onto thermoplastic olefin (TPO) test plaques and air-dried for 10 minutes. After application of the primer, the panels are topcoated with an OEM 2-part urethane paint from Red Spot Paint & Varnish Co.

Paint adhesion tests were conducted in accordance with ASTM D3359B method. The results of this test are as follows: Percent retained adhesion of Red Spot 2-part urethane paint on Dexter & Solvay D-161 TPO: 100%. Percent retained adhesion of Red Spot 2-part urethane paint on Montell CA 187 TPO: 100%

Cleveland humidity testing was conducted in accordance with ASTM D 4585 in conjunction with ASTM D 3359 at 49° C. The results were as follows: Percent retained adhesion after 48 hours exposure: 100%. Percent retained adhesion after 144 hours exposure: 100%. Percent retained adhesion after 504 hours exposure: 100% Gasoline Resistance was tested using General Motors test GM 9501P Method B. Results is as follows: Percent loss after 1 hour in synthetic fuel mixture 55/45 VM&P naphtha/toluene): 0% with no blistering observed.

Example 2

This example illustrates the preparation of a composition of the invention using a particular maleated amorphous polyolefin in combination with a blend of an aromatic hydrocarbon solvent with an aliphatic hydrocarbon solvent.

25 grams of a maleated amorphous propylene-ethylene copolymer comprised of about 87 mole percent propylene and about 13 mole percent ethylene having an acid number of 39 were dissolved in 75 grams of xylene at 130° F. for 1 hour. The $M_n$ of the modified polymer was 4500 g/mol. 20 grams of the 25% polymer/xylene solution were reduced with 80 grams of naphtha, to give a 5 percent, by weight, solids primer solution.

This composition was spray applied as a primer onto thermoplastic olefin (TPO) test plaques and air-dried for 10 minutes. After application of the primer coat, some of the panels were topcoated with OEM basecoat/clearcoat paint from PPG Industries, and others are topcoated with an OEM 2-part urethane paint from Red Spot Paint & Varnish Co.

Paint adhesion tests were conducted in accordance with ASTM D3359B method. Results of this test are as follows: Percent retained adhesion of PPG BC/CC paint on Dexter & Solvay D-161 TPO: 100%. Percent retained adhesion of PPG BC/CC paint on Montell CA 187 TPO: 100%. Percent retained adhesion of Red Spot 2-part urethane paint on Dexter & Solvay D-161 TPO: 100%. Percent retained adhesion of Red Spot 2-part urethane paint on Montell CA 187 TPO: 100%.

Thus, this primer provides excellent adhesion for the topcoat paints on the TPO plastic.

Example 3

This example illustrates the preparation of a composition of the invention using a particular maleated amorphous polyolefin in combination with a blend of an aromatic hydrocarbon solvent with an ester solvent.

25 grams of a maleated amorphous propylene-ethylene copolymer comprised of about 87 mole percent propylene and about 13 mole percent ethylene having an acid number of 39 were dissolved in 75 grams of xylene at 130° F. for 1 hour. The $M_n$ of the modified polymer was 4500 g/mol. 20 grams of the polymer/xylene solution were reduced with 80 grams of n-butyl acetate, to give a 5 percent, by weight, solids primer solution.

This composition was spray applied as a primer onto thermoplastic olefin (TPO) test plaques and air-dried for 10 minutes. After application of the primer coat, some of the panels were topcoated with OEM basecoat/clearcoat paint from PPG Industries, and others are topcoated with an OEM 2-part urethane paint from Red Spot Paint & Varnish Co.

Paint adhesion tests were conducted in accordance with ASTM D3359B method. Results of this test were as follows: Percent retained adhesion of PPG BC/CC paint on Dexter & Solvay D-161 TPO: 100%. Percent retained adhesion of PPG BC/CC paint on Montell CA 187 TPO: 100%. Percent retained adhesion of Red Spot 2-part urethane paint on Dexter & Solvay D-161 100%. Percent retained adhesion of Red Spot 2-part urethane paint on Montell CA 187 TPO: 100%.

Similarly good results are achieved when the primer solutions contain 1 weight percent or 25 weight percent of the maleated propylene-ethylene copolymer.

Example 4

This example illustrates the preparation of a composition of the invention using a particular maleated amorphous polyolefin in combination with a blend of an aliphatic hydrocarbon solvent with an ester solvent.

25 grams of a maleated amorphous propylene-ethylene copolymer comprised of about 87 mole percent propylene and about 13 mole percent ethylene having an acid number of 39 were dissolved in 75 grams of heptane at 130° F. for 1 hour. The $M_n$ of the modified polymer was 4500 g/mol. 20 grams of the polymer/heptane solution were reduced with 80 grams of n-butyl acetate to give a 5 percent, by weight, solids primer solution.

This composition was spray applied as a primer onto thermoplastic olefin (TPO) test plaques and air-dried for 10 minutes. After application of the primer coat, some of the panels were topcoated with OEM basecoat/clearcoat paint from PPG Industries, and others are topcoated with an OEM 2-part urethane paint from Red Spot Paint & Varnish Co.

Paint adhesion tests were conducted in accordance with ASTM D3359B method. The results of this test are as follows: Percent retained adhesion of PPG BC/CC paint on Dexter & Solvay D-161 TPO: 100%. Percent retained adhesion of PPG BC/CC paint on Montell CA 187 TPO: 100%. Percent retained adhesion of Red Spot 2-part urethane paint on Dexter & Solvay D-161 TPO: 100%. Percent retained adhesion of Red Spot 2-part urethane paint on Montell CA 187 TPO: 100%.

Similarly good results are achieved when the solvent mixture is a 50/50-blend of heptane and n-butyl acetate.

Example 5

This example illustrates the preparation of a composition of the invention using a particular maleated amorphous polyolefin in combination with a blend of an aliphatic hydrocarbon solvent with an ester solvent.

25 grams of a maleated amorphous propylene-ethylene copolymer comprised of about 87 mole percent propylene and about 13 mole percent ethylene having an acid number of 39 were dissolved in 75 grams of naphtha at 130° F. for 1 hour. The $M_n$ of the modified polymer was 4500 g/mol. 20 grams of the polymer/naphtha solution were reduced with 80 grams of isobutyl acetate to give a 5 percent, by weight, solids primer solution.

This composition was spray applied as a primer onto thermoplastic olefin (TPO) test plaques and air-dried for 10 minutes. After application of the primer coat, some of the panels were topcoated with OEM basecoat/clearcoat paint from PPG Industries, and others were topcoated with an OEM 2-part urethane paint from Red Spot Paint & Varnish Co.

Paint adhesion tests were conducted in accordance with ASTM D3359B method. Results of this test were as follows: Percent retained adhesion of PPG BC/CC paint on Dexter & Solvay D-161 TPO: 100%. Percent retained adhesion of PPG BC/CC paint on Montell CA 187 TPO: 100%. Percent retained adhesion of Red Spot 2-part urethane paint on Dexter & Solvay D-161 TPO: 100%. Percent retained adhesion of Red Spot 2-part urethane paint on Montell CA 187 TPO: 100%.

Similarly good results are achieved when the maleated copolymer is 72 mole percent propylene and 28 mole percent ethylene.

Example 6

This example illustrates the preparation of a composition of the invention using a particular maleated amorphous polyolefin in combination with a blend of an aromatic hydrocarbon solvent with a ketone solvent. 25 grams of a maleated amorphous propylene-ethylene copolymer comprised of about 87 mole percent propylene and about 13 mole percent ethylene having an acid number of 39 were dissolved in 75 grams of xylene at 130° F. for 1 hour. The $M_n$ of the modified polymer was 4500 g/mol. 20 grams of the polymer/xylene solution were reduced with 80 grams of methyl n-amyl ketone to give a 5 percent, by weight, solids primer solution.

This composition was spray applied as a primer onto thermoplastic olefin (TPO) test plaques and air-dried for 10 minutes. After application of the primer coat, some of the panels were topcoated with OEM basecoat/clearcoat paint from PPG Industries, and others were topcoated with an OEM 2-part urethane paint from Red Spot Paint & Varnish Co.

Paint adhesion tests were conducted in accordance with ASTM D3359B method. The results of this test were as follows: Percent retained adhesion of PPG BC/CC paint on Dexter & Solvay D-161 TPO: 100%. Percent retained adhesion of PPG BC/CC paint on Montell CA 187 TPO: 100%. Percent retained adhesion of Red Spot 2-part urethane paint on Dexter & Solvay D-161 TPO: 100%. Percent retained adhesion of Red Spot 2-part urethane paint on Montell CA 187 TPO: 100%.

Similarly good results are achieved when the test panels are high-density polyethylene or linear low-density polyethylene instead of TPO resin.

Example 7

This example illustrates the preparation of a composition of the invention using a particular maleated amorphous polyolefin in combination with a blend of an aliphatic hydrocarbon solvent with a ketone solvent.

25 grams of a maleated amorphous propylene-ethylene copolymer comprised of about 87 mole percent propylene and about 13 mole percent ethylene having an acid number of 39 were dissolved in 75 grams of naphtha at 130° F. for 1 hour. The $M_n$ of the modified polymer was 4500 g/mol. 20 grams of the polymer/naphtha solution were reduced with 80 grams of methyl n-amyl ketone to give a 5 percent, by weight, solids primer solution.

This composition was spray applied as a primer onto thermoplastic olefin (TPO) test plaques and air-dried for 10 minutes. After application of the primer coat, some of the panels are topcoated with OEM basecoat/clearcoat paint from PPG Industries, and others are topcoated with an OEM 2-part urethane paint from Red Spot Paint & Varnish Co.

Paint adhesion tests were conducted in accordance with ASTM D3359B method. The results of this test were as follows: Percent retained adhesion of PPG BC/CC paint on Dexter & Solvay D-161 TPO: 100%. Percent retained adhesion of PPG BC/CC paint on Montell CA 187 TPO: 100%. Percent retained adhesion of Red Spot 2-part urethane paint on Dexter & Solvay D-161 TPO: 100%. Percent retained adhesion of Red Spot 2-part urethane paint on Montell CA 187 TPO: 100%.

Similarly good results are achieved when the test panels are polypropylene instead of TPO resin.

Example 8

This example illustrates the preparation of a composition of the invention using a particular maleated amorphous polyolefin in combination with a blend of an aliphatic hydrocarbon solvent, ester solvent, and an aromatic hydrocarbon solvent. 25 grams of a maleated amorphous propylene-ethylene copolymer comprised of about 87 mole percent propylene and about 13 mole percent ethylene having an acid number of 39 were dissolved in 75 grams of a naphtha/n-butyl acetate solvent blend (1:1) at 130° F. for 1 hour. The $M_n$ of the modified polymer was 4500 g/mol. 20 grams of the polymer/(naphtha/n-butyl acetate) solutions were reduced with 80 grams of toluene to give a 5 percent, by weight, solids primer solution.

This composition was spray applied as a primer onto thermoplastic olefin (TPO) test plaques and air-dried for 10 minutes. After application of the primer coat, some of the panels were topcoated with OEM basecoat/clearcoat paint from PPG Industries, and others were topcoated with an OEM 2-part urethane paint from Red Spot Paint & Varnish Co. Paint adhesion tests were conducted in accordance with ASTM D3359B method. Results of this test were as follows: Percent retained adhesion of PPG BC/CC paint on Dexter & Solvay D-161 TPO: 100%. Percent retained adhesion of PPG BC/CC paint on Montell CA 187 TPO: 100%. Percent retained adhesion of Red Spot 2-part urethane paint on Dexter & Solvay D-161 TPO: 100%. Percent retained adhesion of Red Spot 2-part urethane paint on Montell CA 187 TPO: 100%.

Example 9

This example illustrates the preparation of a composition of the invention using a particular maleated amorphous polyolefin in combination with a blend of an aromatic hydrocarbon solvent with an aliphatic hydrocarbon solvent.

25 grams of a maleated amorphous propylene-1-hexene copolymer comprised of 45 mole percent propylene and 55 mole percent hexene having an acid number of 35 were dissolved in 75 grams of xylene at 130° F. for 1 hour. The $M_n$ of the modified polymer was 7900 g/mol. 20 grams of the 25% polymer/xylene solution were reduced with 80 grams of naphtha, to give a 5 percent, by weight, solids primer solution.

This composition was spray applied as a primer onto thermoplastic olefin (TPO) test plaques and air-dried for 10 minutes. After application of the primer coat, some of the panels were topcoated with OEM basecoat/clearcoat paint from PPG Industries, and others were topcoated with an OEM 2-part urethane paint from Red Spot Paint & Varnish Co.

Paint adhesion tests are conducted in accordance with ASTM D3359B method. Results of this test were as follows: Percent retained adhesion of PPG BC/CC paint on Dexter & Solvay D-161 TPO: 100%. Percent retained adhesion of PPG BC/CC paint on Montell CA 187 TPO: 100%. Percent retained adhesion of Red Spot 2-part urethane paint on Dexter & Solvay D-161 TPO: 100%. Percent retained adhesion of Red Spot 2-part urethane paint on Montell CA 187 TPO: 100%.

Example 10

This example illustrates the preparation of a composition of the invention using a particular maleated amorphous polyolefin in combination with a blend of an aromatic hydrocarbon solvent with an aliphatic hydrocarbon solvent.

25 grams of a maleated amorphous propylene homopolymer having an acid number of 42 were dissolved in 75 grams of xylene at 130° F. for 1 hour. 20 grams of the 25% polymer/xylene solution were reduced with 80 grams of naphtha, to give a 5 percent, by weight, solids primer solution.

This composition was spray applied as a primer onto thermoplastic olefin (TPO) test plaques and air-dried for 10 minutes. After application of the primer coat, some of the panels were topcoated with OEM basecoat/clearcoat paint from PPG Industries, and others were topcoated with an OEM 2-part urethane paint from Red Spot Paint & Varnish Co.

Paint adhesion tests were conducted in accordance with ASTM D3359B method. Results of this test were as follows: Percent retained adhesion of PPG BC/CC paint on Dexter & Solvay D-161 TPO: 100%. Percent retained adhesion of PPG BC/CC paint on Montell CA 187 TPO: 100%. Percent retained adhesion of Red Spot 2-part urethane paint on Dexter & Solvay D-161 TPO: 100%. Percent retained adhesion of Red Spot 2-part urethane paint on Montell CA 187 TPO: 100%.

Example 11

This example illustrates the preparation of a composition of the invention using a particular maleated amorphous polyolefin in combination with a blend of an aromatic hydrocarbon solvent with an aliphatic hydrocarbon solvent.

25 grams of a maleated amorphous propylene-ethylene-1-butene terpolymer comprised of 69 mole percent propylene, 6 mole percent ethylene, and 25 mole percent 1-butene having an acid number of 39 were dissolved in 75 grams of xylene at 130° F. for 1 hour. 20 grams of the 25% polymer/xylene solution were reduced with 80 grams of naphtha, to give a 5 percent, by weight, solids primer solution.

This composition was spray applied as a primer onto thermoplastic olefin (TPO) test plaques and air-dried for 10 minutes. After application of the primer coat, some of the panels were topcoated with OEM basecoat/clearcoat paint from PPG Industries, and others were topcoated with an OEM 2-part urethane paint from Red Spot Paint & Varnish Co.

Paint adhesion tests were conducted in accordance with ASTM D3359B method. The results of this test were as follows: Percent retained adhesion of PPG BC/CC paint on Dexter & Solvay D-161 TPO: 100%. Percent retained adhesion of PPG BC/CC paint on Montell CA 187 TPO: 100%. Percent retained adhesion of Red Spot 2-part urethane paint on Dexter & Solvay D-161 TPO: 100%. Percent retained adhesion of Red Spot 2-part urethane paint on Montell CA 187 TPO: 100%.

Example 12

This example illustrates the preparation of a composition of the invention using a particular maleated amorphous polyolefin in combination with a blend of an aliphatic hydrocarbon solvent with an ester solvent. 25 grams of a maleated amorphous propylene-ethylene copolymer comprised of about 87 mole percent propylene and about 13 mole percent ethylene having an acid number of 39 were dissolved in 75 grams of a naphtha/n-butyl acetate solvent blend (1:1) at 130° F. for 1 hour. The $M_n$ of the modified polymer was 4500 g/mol. This composition was used as an additive to a Dupont acrylic enamel topcoat (10 grams amorphous, non-chlorinated, maleated propylene-ethylene copolymer solution/100 grams Dupont acrylic enamel topcoat) and spray applied as a one-coat system onto thermoplastic olefin (TPO) test plaques.

After application of the one-coat system, paint adhesion tests were conducted in accordance with ASTM D3359B method. The results of this test were as follows: Percent retained adhesion of amorphous maleated propylene-ethylene copolymer/ Dupont acrylic enamel one-coat system onto Dexter & Solvay D-161 TPO: 100%. Percent retained adhesion of amorphous maleated propylene-ethylene copolymer/Dupont acrylic enamel one-coat system onto Montell CA 187 TPO: 100%.

Example 13

The following is an example of a maleated propylene-butene copolymer. 5 grams of a maleated amorphous propylene-1-butene copolymer Rextac RT 2870 having an acid number of 35 was dissolved in 95 grams of toluene at 130° F. to give a 5 percent, by weight, solids primer solution. The $M_n$ of the modified polymer was 3100 g/mol.

This composition was spray applied as a primer onto thermoplastic olefin (TPO) test plaques and air-dried for 10 minutes. After application of the primer coat the panels were topcoated with an OEM 2-part urethane paint from Red Spot Paint & Varnish Co.

Paint adhesion tests were conducted in accordance with ASTM D3359B method. Results of this test were as follows: Percent retained adhesion of Red Spot 2-part urethane paint on Dexter & Solvay D-161 TPO: 100%. Percent retained adhesion of Red Spot 2-part urethane paint on Montell CA 187 TPO: 100%.

Cleveland humidity testing was conducted in accordance with ASTM D 4585 in conjunction with ASTM D 3359 at 49° C. The results were as follows: Percent retained adhesion after 48 hours exposure: 20%. Percent retained adhesion after 144 hours exposure: 0%.

Example 14

The following is an example of maleated propylene-ethylene copolymer with less than 75% propylene content. 5 grams of a maleated amorphous propylene-ethylene copolymer, (Vestoplast 828), containing 56 mole % propylene and 44% ethylene and having an acid number of 65 was dissolved in 95 grams of xylene at 130° F. to give a 5 percent, by weight, solids primer solution. The $M_n$ of the modified polymer was 6700 g/mol.

This composition was spray applied as a primer onto thermoplastic olefin (TPO) test plaques and air-dried for 10 minutes. After application of the primer coat the panels were topcoated with an OEM 2-part urethane paint from Red Spot Paint & Varnish Co. Paint adhesion tests were conducted in accordance with ASTM D3359B method. The results of this test were as follows: Percent retained adhesion of Red Spot 2-part urethane paint on Dexter & Solvay D-161 TPO: 100%. Percent retained adhesion of Red Spot 2-part urethane paint on Montell CA 187 TPO: 100%.

Gasoline Resistance was tested using General Motors test GM 9501P Method B. The results were as follows: Percent loss after 1 hour in synthetic fuel mixture (55/45 VM&P naphtha/toluene): 2%–75% blistering was observed.

The GPC analysis for Examples 1–14 was performed on a Polymer Labs 210 GPC system equipped with a refractive index detector and a Viscotek 210R viscometer. Samples were prepared by making ~1 mg/ml solutions in 1,2,4-trichlorobenzene which contained 0.05% (w/v) 2,6-di-tert-butyl-4-methylphenol as an antioxidant. The samples were dissolved under stirring at 150° C. for 2 hours and then filtered through 1.0 μm unbound glass fiber filters. The GPC oven, column and detector compartment was maintained at 140° C. The column set consisted of 3 Polymer Labs PLGel Mixed-B columns and one PLGel Mixed-B 10 μm guard column. The system was calibrated using a set of polystyrene narrow molecular weight distribution standards ranging from 7,500,000 to 7,000 g/mol. The calibration curve was a universal calibration using the combination of the refractive index and viscometry detectors. Molecular weight values are reported in absolute values as obtained through the universal calibration method.

The claimed invention is:
1. A solvent-based primer composition comprising a solution of:
about 0.5 to about 40 weight percent of a modified polyolefin having a number average molecular weight of up to 15,000 comprising an amorphous polyolefin selected from polypropylene homopolymers, copolymers, terpolymers and mixtures thereof, wherein the propylene copolymers and terpolymers contain about 1 to about 99 mole percent ethylene, 1-butene, 1-pentene, and 1-hexene, the amorphous polyolefin being grafted with one or more unsaturated carboxylic acids selected from the group consisting of acids, esters and anhydrides in a solvent selected from the group consisting of ester solvents, ketone solvents, aliphatic solvents, aromatic solvents and mixture thereof.

2. The solvent-based primer composition of claim 1, wherein said unsaturated carboxylic acid esters or anhydrides are selected from the group consisting of maleic acid, maleic anhydride, fumaric acid, citraconic anhydride, aconitic anhydride, itaconic anhydride, methacrylic acid and acrylic acid.

3. The solvent-based primer composition of claim 1, wherein the solvent is selected from toluene, xylene, heptane, naphtha, mineral spirits, ethyl acetate, propyl acetate, isopropyl acetate, butyl acetate, isobutyl acetate, amyl acetate, ethyl propionate, propyl propionate, isobutyl isobutyrate and petroleum distillates.

4. The solvent-based primer composition of claim 3, wherein the solvent comprises:
 about 1 to about 99 weight percent of the solvent; and
 a co-solvent selected from the group consisting of acetone, methyl ethyl ketone, methyl isobutyl ketone, methyl amyl ketone and mixtures thereof.

5. The solvent-based primer composition of claim 1, wherein the modified polyolefin has an acid number ranging from about 10 to about 100.

6. The solvent-based primer composition of claim 5, wherein the modified polyolefin has an acid number ranging from about 20 to about 60.

7. The solvent-based primer composition of claim 1, wherein the modified polyolefin has a molecular weight ranging from about 1,000 to about 10,000.

8. The solvent-based primer composition of claim 7, wherein the modified polyolefin has a molecular weight ranging from about 4,000 to about 10,000.

9. The solvent-based primer composition of claim 1, wherein the amorphous polyolefin is a propylene copolymer or terpolymer containing greater than about 70 mole percent propylene.

10. The solvent-based primer composition of claim 9, wherein the amorphous polyolefin is a propylene copolymer or terpolymer containing about 80 to about 90 mole percent propylene.

11. The solvent-based primer composition of claim 1, wherein the solvent is present in an amount ranging from about 60 to about 99.5 weight percent.

12. The solvent-based primer composition of claim 1, comprising:
 about 0.5 to about 15 weight percent of the modified polyolefin, and
 about 85 to about 99.5 weight percent solvent.

13. The solvent-based primer composition of claim 1, wherein the amorphous polyolefin is a chlorinated amorphous polyolefin.

14. The solvent-based primer composition of claim 1, wherein the primer composition is capable of improving the adherence of paint to polyolefin substrate.

15. The solvent-based primer composition of claim 1, wherein the modified polyolefin has a Ring and Ball Softening Point ranging from about 90° C. to about 165° C.

16. The solvent-based primer composition of claim 1, wherein the modified polyolefin has a glass transition temperature ranging from about −30° C. to −10° C.

17. A solvent-based primer composition comprising:
 about 5 to about 10 weight percent of a modified polyolefin having an acid number ranging from about 20 to about 60 and a number average molecular weight ranging from about 4,000 to about 10,000 comprising an amorphous polyolefin selected from the group consisting of polypropylene copolymers, polypropylene terpolymer and mixtures thereof, wherein the amorphous polyolefin contains about 80 to about 90 mole percent propylene, the polyolefin being chemically modified with one or more unsaturated carboxylic acids selected from the group consisting of acids, esters and anhydrides; and
 about 85 to about 95 weight percent of a solvent selected from the group consisting of ester solvents, ketone solvents, aliphatic solvents, aromatic solvents and mixtures thereof.

18. A method of improving the adherence of paint to a substrate comprising the steps of:
 applying a solvent-based primer composition to a substrate,
 wherein the primer composition comprises about 0.5 to about 40 weight percent of a modified polyolefin having a number average molecular weight ranging from about 1,000 to 15,000 comprising an amorphous polyolefin selected from polypropylene homopolymers, copolymers, terpolymers and mixtures thereof, wherein the propylene copolymers and terpolymers contain about 1 to about 99 mole percent ethylene, 1-butene, 1-pentene, and 1-hexene, the amorphous polyolefin being chemically modified with one or more unsaturated carboxylic acids selected from the group consisting of acids, esters and anhydrides, and a solvent selected from the group consisting of ester solvents, ketone solvents, aliphatic solvents, aromatic solvents and mixtures thereof.

19. The method of claim 18, wherein the substrate is a polyolefin substrate.

20. The method of claim 18, comprising the additional step of:
 coating the primed polyolefin substrate with paint.

* * * * *